(12) United States Patent
McLellan et al.

(10) Patent No.: US 9,550,597 B2
(45) Date of Patent: Jan. 24, 2017

(54) WRAPPING MATERIAL REMOVAL METHOD

(71) Applicant: Poet Research, Inc., Sioux Falls, SD (US)

(72) Inventors: Brandon L. McLellan, Sioux Falls, SD (US); Todd L. Peterson, Brandon, SD (US)

(73) Assignee: POET Research, Inc., Sioux Falls, SD (US)

( * ) Notice: Subject to any disclaimer, the term of this patent is extended or adjusted under 35 U.S.C. 154(b) by 217 days.

(21) Appl. No.: 14/391,566

(22) PCT Filed: Mar. 14, 2013

(86) PCT No.: PCT/US2013/031528
§ 371 (c)(1),
(2) Date: Oct. 9, 2014

(87) PCT Pub. No.: WO2013/154746
PCT Pub. Date: Oct. 17, 2013

(65) Prior Publication Data
US 2015/0059145 A1 Mar. 5, 2015

Related U.S. Application Data

(60) Provisional application No. 61/622,108, filed on Apr. 10, 2012.

(51) Int. Cl.
*B65B 69/00* (2006.01)
*B23P 19/04* (2006.01)

(52) U.S. Cl.
CPC ............ *B65B 69/0025* (2013.01); *B23P 19/04* (2013.01); *B65B 69/0033* (2013.01);
(Continued)

(58) Field of Classification Search
CPC .... B23P 19/04; Y10T 29/53; Y10T 29/49821; Y10T 29/5139; Y10S 83/924; B65B 69/0025
See application file for complete search history.

(56) References Cited

U.S. PATENT DOCUMENTS 4,551,897 A 11/1985 Holt
5,179,878 A * 1/1993 Kranefeld ........... B65B 69/0025
29/426.4
(Continued)

FOREIGN PATENT DOCUMENTS

FR 2956857 A3 9/2011
GB 2184704 A 7/1987

OTHER PUBLICATIONS

Stover Equipment Co., Inc., Stover Unwrapper GIS (GIN Improvement System) Brochure, 2009.

*Primary Examiner* — Jermie Cozart
(74) *Attorney, Agent, or Firm* — Kagan Binder, PLLC (57) ABSTRACT

A material removal method for removing net wrap or twine from the outer surface of a bale of material. The method comprises the steps of cutting the net wrap or twine material along a length of the bale, placing a first spear (62, 162) of a material wind-up system (60, 160) between the bale and the material, rotating the material wind-up system to wind the net wrap or twine material around the first (62, 162) and a second spear (64, 164) and stripping the material from the first and second spears.

14 Claims, 12 Drawing Sheets

(52) U.S. Cl.
CPC ........ *Y10S 83/924* (2013.01); *Y10T 29/49819* (2015.01); *Y10T 29/49821* (2015.01); *Y10T 29/53* (2015.01)

(56) References Cited

U.S. PATENT DOCUMENTS

| | | | |
|---|---|---|---|
| 5,199,841 A * | 4/1993 | Von Gehlen | B65B 69/0025 414/412 |
| 5,318,399 A | 6/1994 | Marom | |
| 6,986,233 B1 * | 1/2006 | Covington | B65B 69/0025 29/426.4 |

* cited by examiner

WRAPPING MATERIAL REMOVAL METHOD

CROSS-REFERENCE TO RELATED APPLICATIONS

This application claims priority to International Application No. PCT/US2013/031528, filed on Mar. 14, 2013, which in turn claims the benefit under of U.S. Application No. 61/622,108, filed Apr. 10, 2012, and entitled "NET WRAP AND TWINE REMOVAL MACHINE", the disclosures of which is are incorporated herein by reference.

TECHNICAL FIELD

The present invention relates generally to processing large bales of material and more particularly relates to removing wrapping material that is used to contain the materials within the bale prior to further processing of the bale material.

BACKGROUND

In recent years, there has been significant interest in the production of organic chemicals, such as ethanol, from fermentable sugars that are derived from cellulosic biomass. Useful cellulosic biomass includes, for example, corncobs, cornstover (e.g., stalks and leaves), switchgrass, wood chips, and other plant matter.

In order to facilitate the storage and transportation (e.g., to a cellulosic ethanol plant) of cellulosic biomass, the biomass is harvested from the field and is then formed into bales. Common bale configurations include "square bales" (e.g., a bale in the form of a rectangular cube typically measuring about 3'×4'×8') and "round bales" (e.g., a bale in the form of a right circular cylinder typically measuring about 6' in diameter and 5' in length). To provide structural integrity for storage and handling, the bales are often tied with wrapping material such as twine, which is more typical for square bales, or are wrapped with a net wrap or open weave material, which is more typical for round bales.

Once at the cellulosic processing plant, the twine or net wrap must be removed from the bale so that the biomass can by fed into the organic chemical production process. Since a typical cellulosic processing plant may process a large number of bales per day, an automated device for the removal of twine and net wrap from bales is very desirable. In addition, since the incoming bales to the cellulosic processing plant may consist of both square bales and round bales of varying sizes, it is additionally desirable for a single device to be configured to remove twine and/or net wrap from square bales and/or round bales of varying sizes with minimal manual input.

SUMMARY

In cellulosic ethanol processes, materials that are used to tie or wrap individual bales of material (e.g., net wrap and/or twine) must be removed from each bale prior to processing the bale materials in order to avoid complications in various process streams. That is, removing these wrapping materials is necessary to prevent this material from causing mechanical failures or disrupting downstream processes in other ways. Equipment and processes of the present invention are provided to remove the wrapping materials automatically in order to avoid the cumbersome and time-consuming labor required to manually remove these wrapping materials for a commercial scale cellulosic plant.

In one embodiment, the equipment and processes of the invention include using a blade or other sharp cutting member to cut the net wrap, twine, or other material at a location along the length of the bottom of the bale. Such a blade may include a rotating saw or other stationary or rotating cutting device, for example. Such a cutting device can sever the net wrap in a direction that is generally parallel to a longitudinal axis of a round or cylindrical bale, and/or in a direction that is generally parallel to one of the sides of a rectangular bale. The cutting device can either be stationary, with the bale being conveyed past the cutting device during the cutting operation, or the bale can be stationary, with the cutting device traveling along the length of the bale during the cutting operation.

After the wrapping material is cut, multiple rollers can be moved upwardly relative to the deck on which the bale is sitting to engage with the bale at locations that are spaced from the location at which the wrapping material was cut. The multiple rollers can then rotate, such as in opposite directions, in order to pull the wrapping material away from the cut line to move the free ends from under the bale. At this point, the wrapping material will not be constrained by the weight of the bale and is therefore relatively free to move relative to the bale. After this process is complete, a removal device, which may consist of a spear system or a spear and clamp system, can secure the wrapping material and remove it from the outer surface of the bale. The spear system is then rotated on a turret to wind up the wrapping material, and then a cleaning or stripping device removes the material from the clamp and drops it on a conveyor belt or other location for disposal.

BRIEF DESCRIPTION OF THE DRAWINGS

The present invention will be further explained with reference to the appended Figures, wherein like structure is referred to by like numerals throughout the several views, and wherein.

DETAILED DESCRIPTION

The systems and methods of the invention can generally be used with bales of cellulosic biomass or other material that are harvested and formed into bales, including bale configurations that are cylindrical, bale configurations that are rectangular cubes in shape, and/or bale configurations that have a different shape. To provide structural integrity for storage and handling, the shaped bales are initially at least partially surrounded with wrapping material such as twine or a net wrap or other sheet-like and/or open weave material. Although twine is typically used for wrapping square or rectangular bales, while net wrap is typically used for cylindrical bales, it is possible to use either or both types of materials for bales of any shape or size. When a net wrap or open weave material is used to wrap a bale, it typically extends along all or most of the length of the bale, and surrounds the outer periphery of the bale. When a twine or other elongated material is used to wrap a bale, it is typical for the bales to have 4-6 strands or wraps of twine surrounding the outer periphery of the bale and spaced from each other along the length of the bale, although it is possible to have more or less twine strands or wraps. The ends of the bales may or may not be covered or partially covered with wrapping material. It is noted that the material removal systems of the invention can be used with other wrapping materials or combinations of wrapping materials, and can be used with bales having shapes that are not cylinders or rectangular cubes.

Referring now to the Figures, wherein the components are labeled with like numerals throughout the several Figures, and initially to FIGS. 1 through 4, one configuration of a material unwrapping and removal system 10 is illustrated. System 10 generally includes a number of stations, including a cutting station 12, a material pulling station 14, a material wind-up station 16, and a material stripping station 18. Individual bales, each of which includes a layer of wrapping material at least partially surrounding its outer surface, can move sequentially through these stations to remove the wrapping material, as will be described in detail below. In general, however, the system 10 includes a flat conveyor system 20 that extends along the length of the system 10 that is used to move each bale from one end of the system to the other. A number of different conveyor systems can be used, wherein one exemplary system includes a series of belts and/or chains that are positioned to be generally adjacent to each other across the width of the system 10 and each of its stations. The conveyor 20 may include a series of drive chains or roller chains that are driven by an electric motor or gearbox, for example.

The process of wrapping material removal begins by placing a wrapped bale onto the conveyor system 20. The conveyor system 20 can be positioned so that it starts at the cutting station 12 to allow for a bale to be loaded directly into the cutting station 12 (e.g., by a forklift operator) or may start in a location prior to the cutting station 12 such that a bale is conveyed into the cutting station 12 from a loading dock or other area. In either case, the cutting station 12 optionally includes positioning members 30 spaced from each other on opposite sides of the cutting station width. These members 30 include rails 32 that extend from support members 34. The rails 32 can be angled outwardly away from the center of the cutting station 12 at their proximal ends so that they can act as guide rails that keep a bale centered as it enters the cutting station 12. The positioning members 30 are generally positioned at a location that is above the conveyor system 20 and below the top surface of the bales that are being processed so that they can provide the desired centering function. As shown, the positioning members 30 can optionally be adjustable toward and away from the center of the cutting station by moving them laterally along the support members 34. Any number of mechanisms can be used to adjust and secure the positioning members 30 in their desired location, including manual adjustment and securing devices, or automated devices that are controlled by feedback received from sensors, for example.

Figure 5:
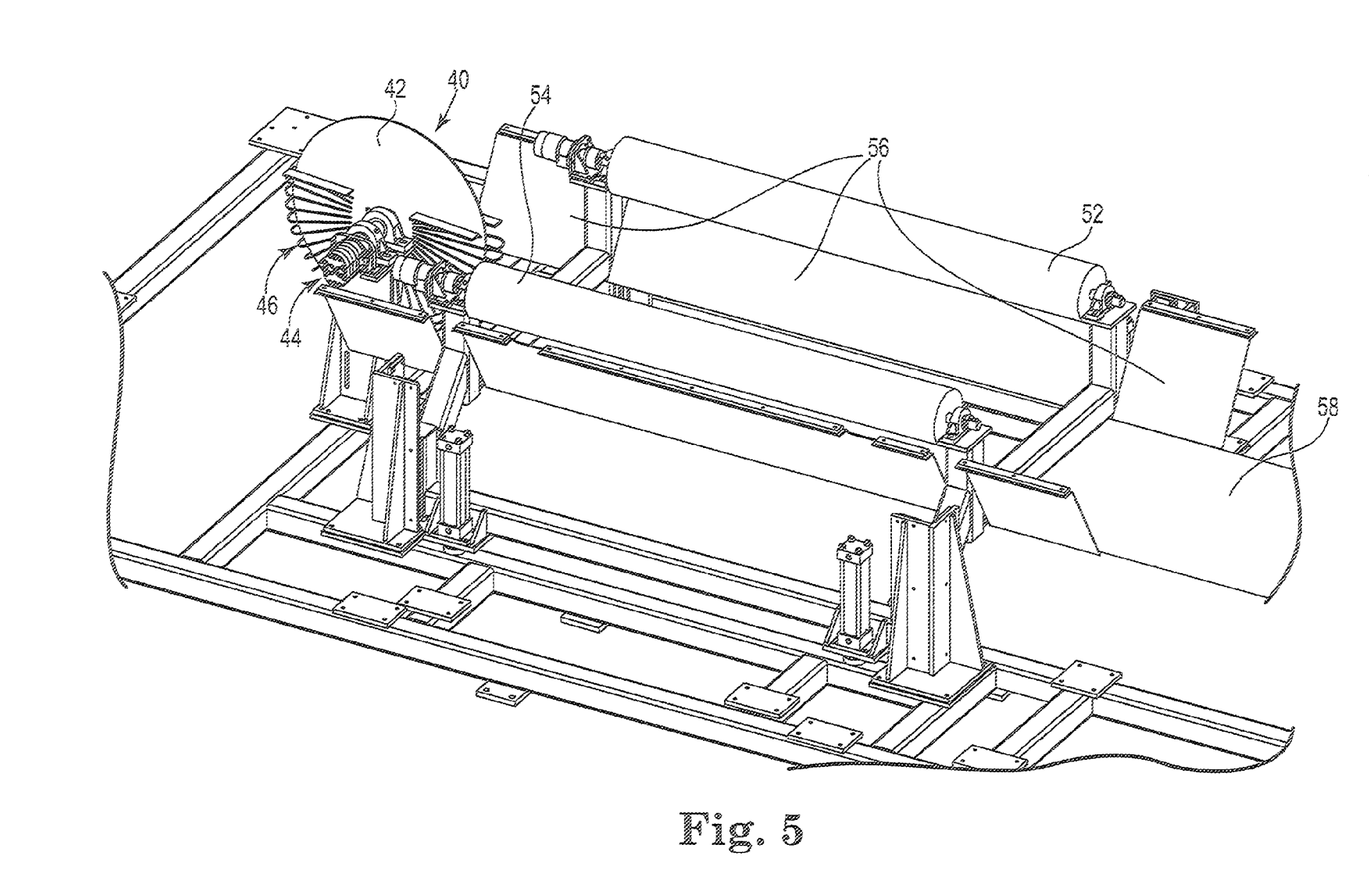
FIG. 5 is a perspective view of a portion of a material pulling station of a material removal system of the invention.

As the bale enters the cutting station 12, it passes over a cutting mechanism 40, which can be a rotating saw blade 42 that is positioned on a support frame 44 (see FIG. 5, for example). The saw blade 42 may be a circular disc with teeth, such as a metal saw blade, or may instead include a disc made of an abrasive or other material that is sufficiently sharp that it can cut easily through the wrapping material. The cutting station 12 may further include a blade guard 46 that covers a portion of the exposed blade. The speed at which the saw blade 42 rotates may be controlled by a conventional motor and control system that provides a required rotation speed to correspond with the particular material that is being cut. Further, the speed at which the bale is moving along the conveyor can be coordinated with the speed of rotation of the saw blade 42 in order to optimize the cutting performance of the saw blade 42.

One or more sensors can be used to determine and monitor the size and location of the bale as it moves into the cutting station 12. The blade 42 extends upwardly through an opening in the deck of the conveyor system 20 and is positioned vertically so that it can cut through any wrapping materials of the bale, but is not positioned so high that it causes excessive damage to the bale itself. In a variation of this process that is within the scope of this invention, the bale can instead be moved into a location within the cutting station prior to any cutting being performed, and the bale can remain stationary while the cutting mechanism 40 is moved along the bale length to cut the wrapping material. In either case, once the wrapping material has been cut, the bale is ready to be moved to the next station of the system 10.

Figure 1:
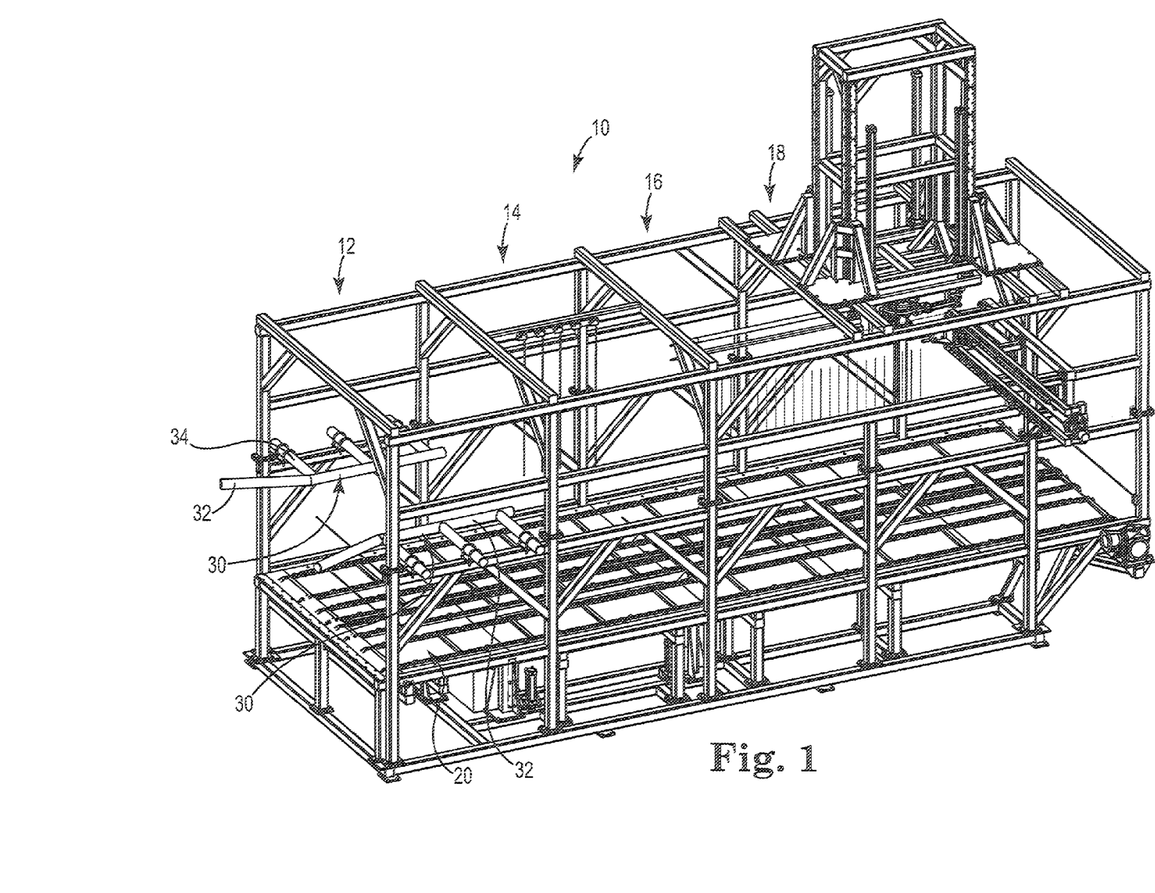
FIG. 1 is a perspective view of a material removal system of the invention, which can be used for removal of wrapping material that at least partially surrounds a bale of material.
Figure 2:
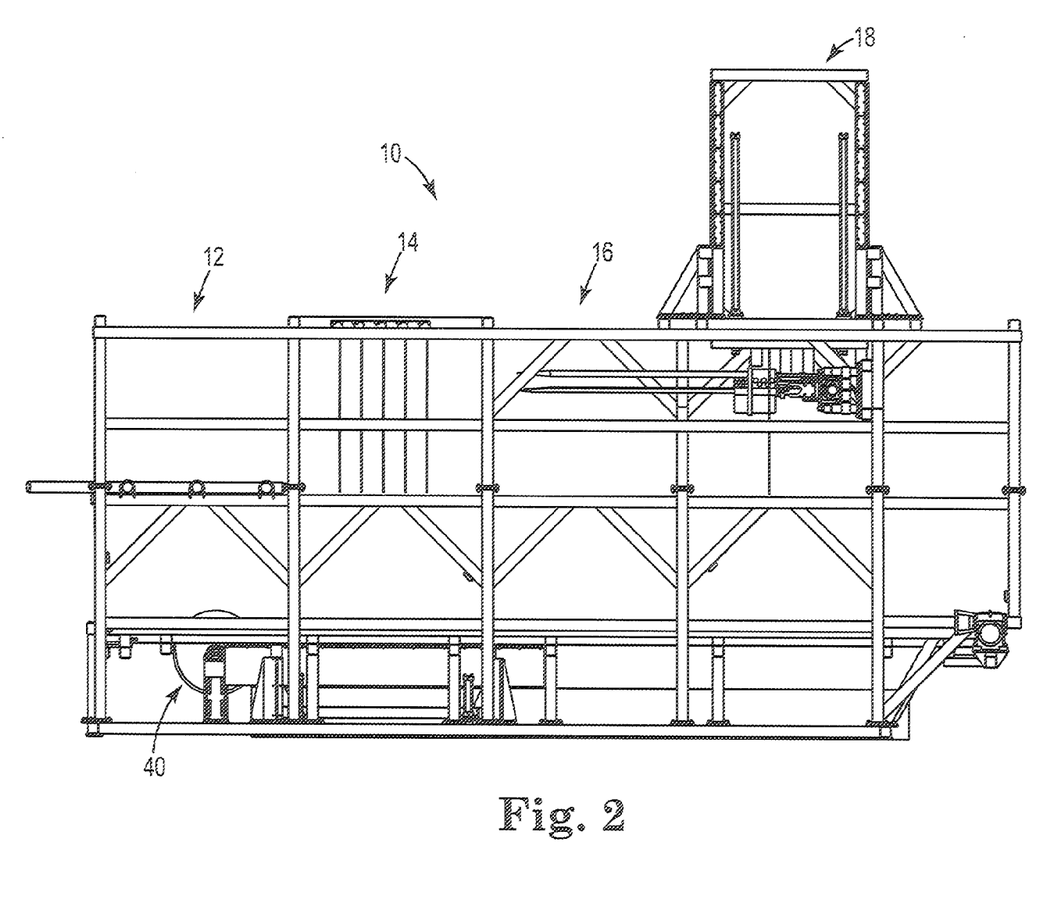
FIG. 2 is a front view of the material removal system of FIG. 1.
Figure 3:
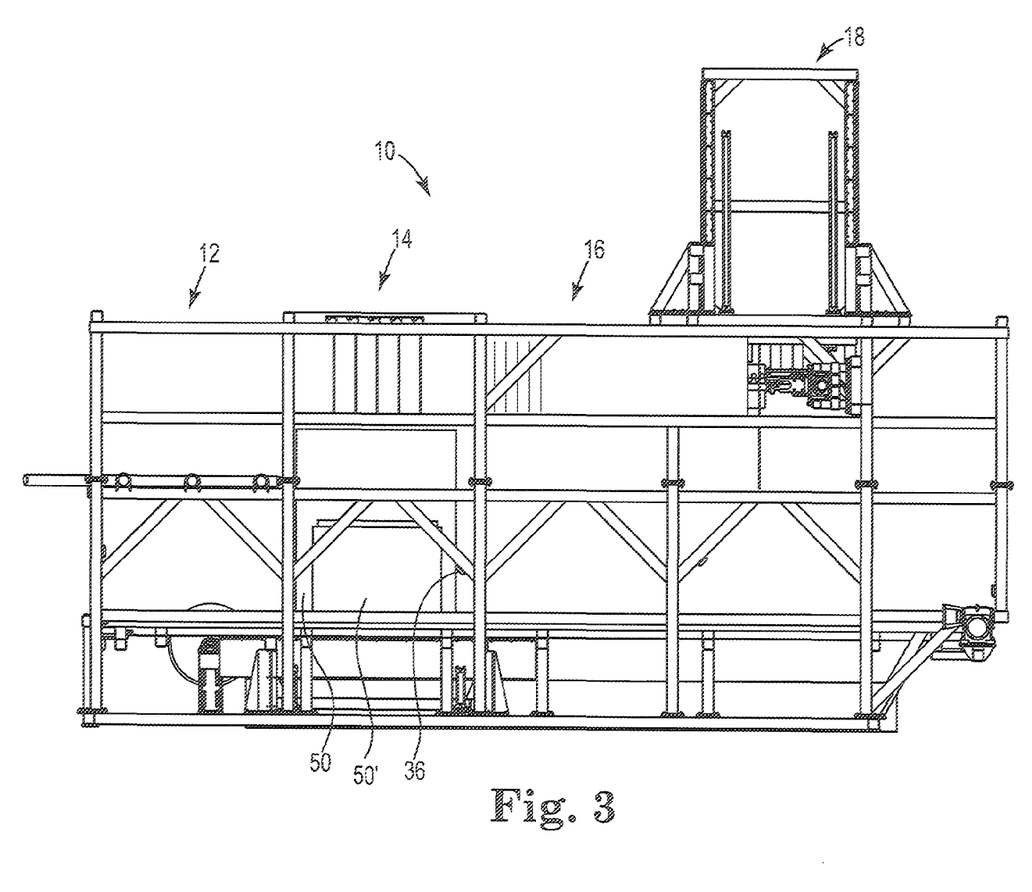
FIG. 3 is another front view of the material removal system of FIG. 1, which shows a round and square bale in an exemplary location in the system.
Figure 4:
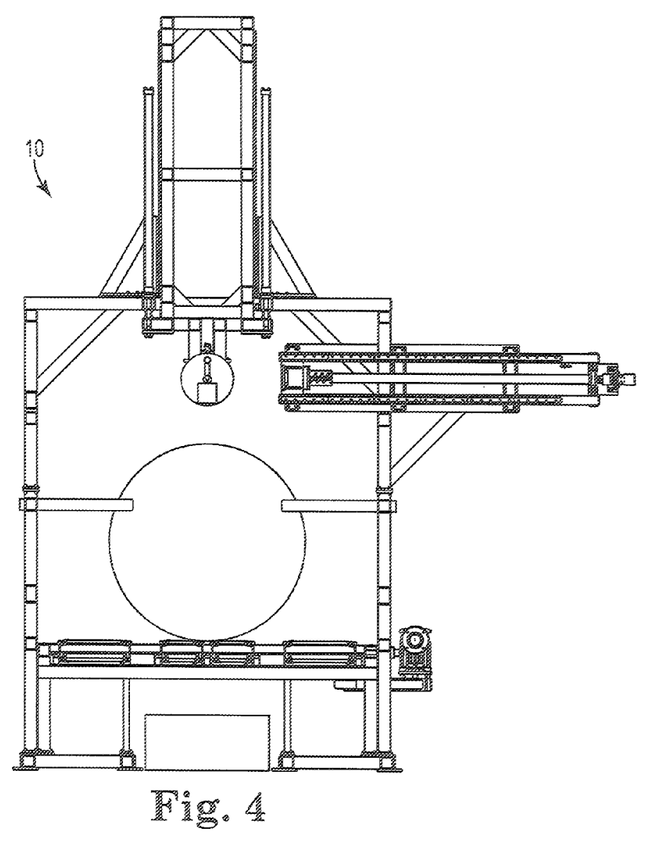
FIG. 4 is a side view of the material removal system of FIG. 1, which shows a round bale in an exemplary location in the system.

The conveyor system 20 is then reactivated to move the bale toward the material pulling station 14. Again, one or more proximity sensors, such as sensor 36 illustrated in FIG. 3, can be used to sense the position of the bale so that it can be stopped in a desired location within the material pulling station before the conveyor 20 is stopped. An exemplary cylindrical bale 50 and an exemplary rectangular bale 50' are illustrated in FIG. 3 as they can be positioned for processing within the station 14. When the bale is in its desired location, rollers 52, 54 can be raised upwardly from beneath the conveyor 20 so that they extend through openings in the conveyor until they contact the bottom surface of the bale. This can be accomplished via hydraulic cylinders, for example. These rollers 52, 54 are also illustrated in FIG. 5, and are preferably long enough that they can contact most or all of the length of the bale that is being processed. The rollers 52, 54 can then be activated so that they rotate in opposite directions from each other to essentially "pull" the wrapping material away from the line along which it was cut in the cutting station 12. That is, the rollers pull the wrapping material(s) (e.g., net wrap and/or twine) from under the bale, while the weight of the bale is at least partially supported by the rollers 52, 54.

The rollers 52, 54 can have a variety of different configurations, but in one exemplary embodiment, the rollers are 8 inches in diameter and are approximately 7 feet long. In order to provide a desired level of friction between the wrapping material and the rollers 52, 54, the outer surface of the rollers can be made of a rubberized material or other material against which the wrapping material does not slip. After the material pulling operation is complete, the rollers 52, 54 can retract below the surface of the conveyor so that they do not interfere with movement of the bale from the station 14. At this point, the cut ends of the wrapping material will generally be loose so that the wrapping material drapes or hangs freely over the top of the bale, and the bale is therefore ready to be moved via the conveyor to the next station of the system 10. It is noted that if the wrapping material is twine, the rolling operation to free the ends of the twine from under the roller may or may not be used, as desired, while the rolling operation would more typically be used for net wrap or other wrapping materials that have more surface area than twine, such as net wrap materials.

Referring again to FIG. 5, the area immediately adjacent to and beneath the rollers 52, 54 may include one or more angled plates 56 that are used for collecting material that comes loose from the bales during the process of conveying the bale and loosening the wrapping material from its outer surface. As shown, the angled plates can direct the loose material downwardly and onto an optional waste conveyor 58, which can convey the material away from the rollers and into a collection area where that loose material can be processed along with the other materials provided by the bale.

Figure 9:
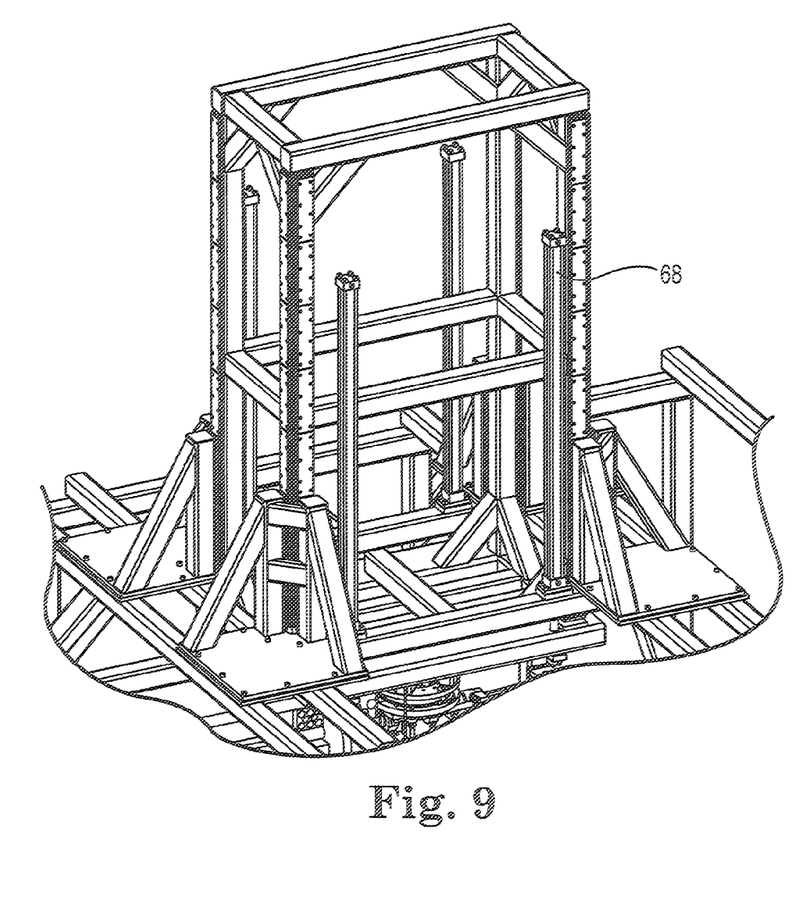
FIG. 9 is an enlarged perspective view of a portion of a material stripping station of a material removal system of the invention.

After the wrapping material ends are free from under the bale, the conveyor system 20 is then reactivated to move the bale into the material wind-up or material removal station 16, which is the station at which the wrapping material is removed from the bale. Again, one or more proximity sensors can be used to sense the position of the bale so that it can be stopped in a desired location within the material removal station 16. Additional proximity sensors (e.g., laser sensors) can be used in this station and/or in one or more of the previous stations to accurately determine the location of the top surface of the bale, which information is transmitted to a controller that can adjust the locations of various components within the station 16. As is illustrated best in FIGS. 6 and 7, the station 16 includes a material wind-up system 60 that includes at least two spears 62, 64 that extend longitudinally from a base plate 66. The material wind-up system 60 is vertically moveable to position one of the spears 62, 64 so that it will be located at least slightly below the wrapping material (i.e., between inner surface of the wrapping material and the outer surface of the bale itself). In one embodiment of the invention, the material wind-up system 60, or portions thereof, are vertically moveable via one or more hydraulic cylinders (e.g., cylinders 68 illustrated in FIG. 9) to position it in a desired location relative to the bale. In this way, as the bale is being moved into the material wind-up station 16, one of the spears 62, 64 will be passing between the wrapping material and the bale along the length of the bale.

Once the bale has been moved into the station 16 by a sufficient distance that one of the spears 62, 64 is fully engaged along its length with the wrapping material, the conveyor system 20 can again be stopped so that the bale is stationary. At this point, the other of the two spears 62, 64 (i.e., the spear that is not positioned under the wrapping material) can optionally be moved to clamp or grasp the wrapping material between the two spears, although it is also contemplated that the spears 62, 64 do not move relative to each other. Whether or not a clamping motion is activated, the material wind-up system 60 can then be moved upwardly at least slightly relative to the outer surface of the bale until a desired amount of tension is placed on the wrapping material. The spears 62, 64 can then be rotated or spun via their support plate. 66 until all or most of the wrapping material is wrapped around the spears 62, 64. Once the wrapping material is wrapped around the spears in this way, the bale can be moved toward the end of the system 10 by reactivating the conveyor until the bale reaches the end of the conveyor and can move into another manufacturing process.

Figure 6:
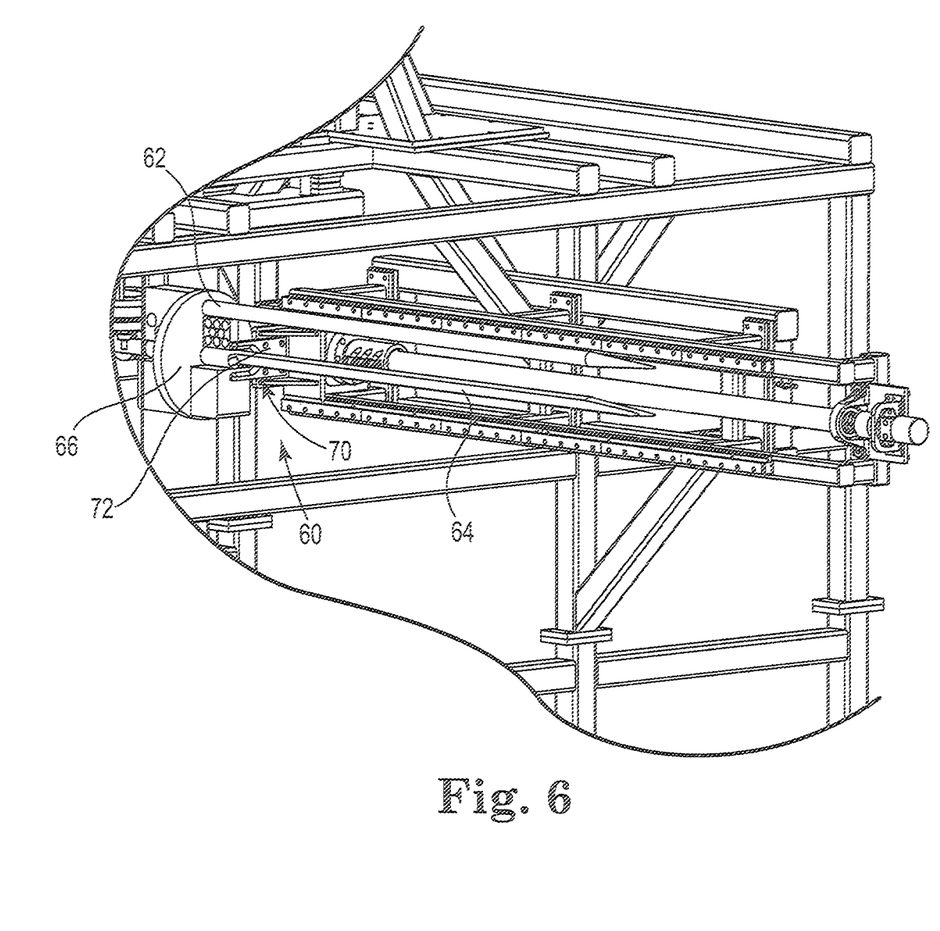
FIG. 6 is a perspective view of a portion of a material wind-up station of a material removal system of the invention.
Figure 7:
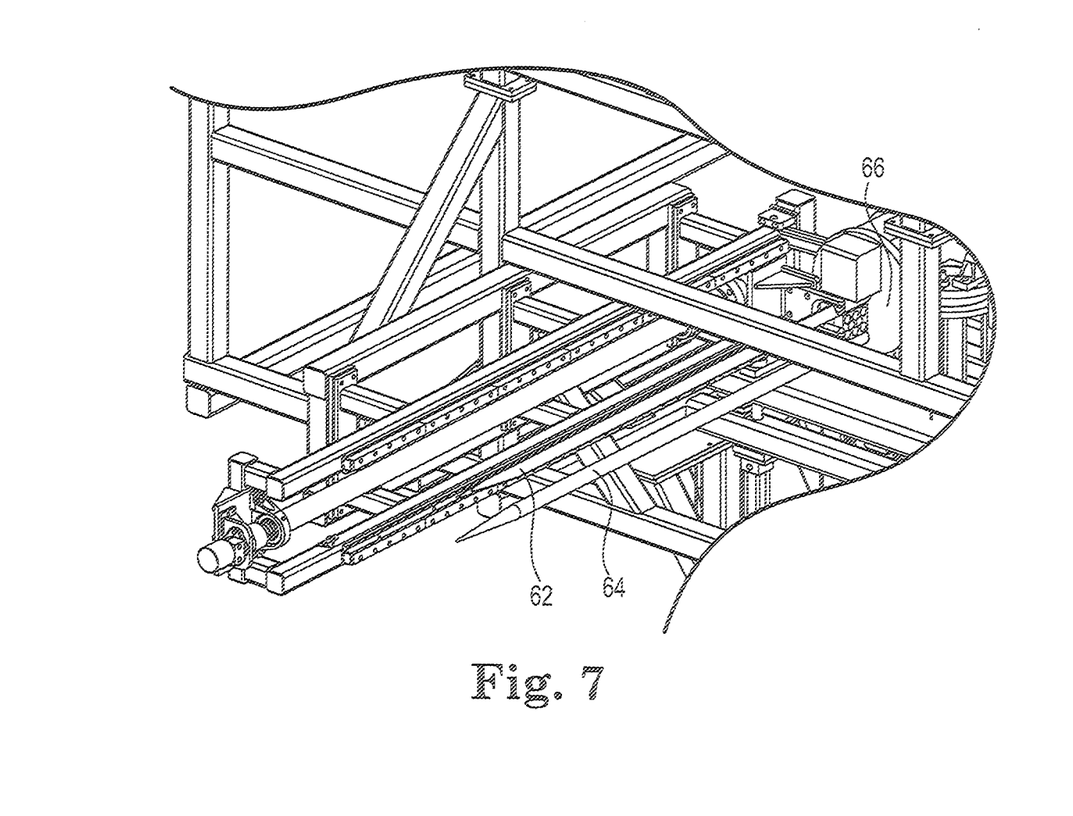
FIG. 7 is a perspective view of a material wind-up system of a material wind-up station of a material removal system of the invention.
Figure 8:
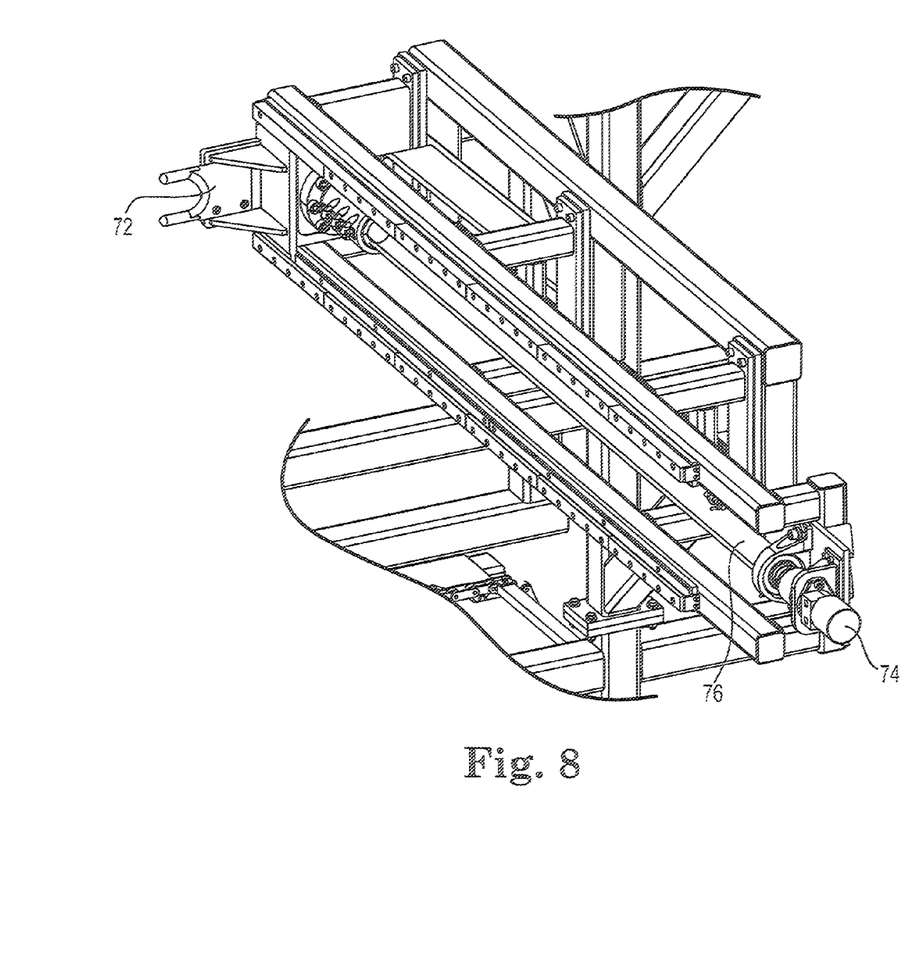
FIG. 8 is a perspective view of a portion of a material stripping station of a material removal system of the invention.

At this point, the wrapping material will be entirely removed from the bale and wrapped around the spears 62, 64, and the material wind-up system 60 can be rotated from a position to where the spears 62, 64 are extending generally along the longitudinal axis of the bale to a position that is at an angle from this longitudinal axis. For example, as is illustrated in FIG. 7, spears 62, 64 can be positioned at approximately 90 degrees from the longitudinal axis of the bale so that they extend outwardly from the area immediately adjacent to the material removal station 16, which is illustrated generally as the material stripping station 18. If one or both of the spears 62, 64 have been moved relative to each other to provide a clamping motion, such a clamping motion can be reversed at this point, if desired, to provide for at least a slight relief of the clamping force on the wrapping material. As is illustrated in FIGS. 6-8, for example, the material removal system further includes an embodiment of a material removal member 70 that is slideable along the length of the spears 62, 64.

In an embodiment, the material removal member 70 comprises a U-shaped stripping bracket 72 with an internal radius that is small enough that the surface of the bracket 72 will push or strip the wrapping material from the spears 62, 64 as it moves laterally along the length of the spears. Although a number of different mechanisms and configurations can be used to move the stripping bracket 72 longitudinally relative to the corresponding spears 62, 64, the embodiment illustrated in FIG. 8 includes a ball screw arrangement that includes a motor 74 at a distal end of the device that rotates a shaft 76 in a first direction to move the bracket 72 from a first end toward a second end of the shaft 76, and then can rotate in an opposite direction to move the bracket 72 from the second end toward a first end of the shaft 76.

In an alternative embodiment, once the wrapping material is positioned on the spears, the spear turret rotates over the top of a conveying system. Once the clamped and wrapped material is in place, the clamp releases slightly and a sleeve including two cutting pins slides and cuts the material from the spear mechanism, after which it can fall on top of a conveyor.

After wrapping material is removed from a bale using the above-described methods and equipment, the various stations and systems can then return to their original staged positions until another bale is introduced into the system 10.

Figure 10:
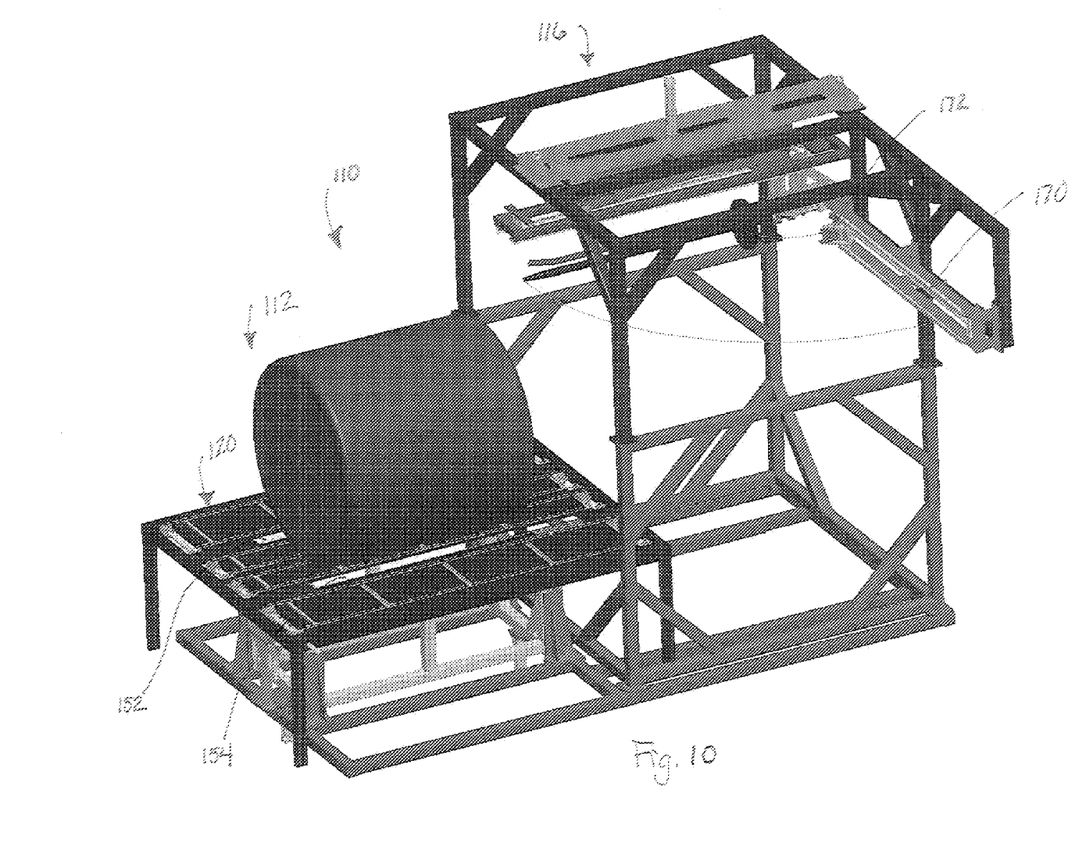
FIG. 10 is a perspective view of another embodiment of a material removal system of the invention, which can be used for removal of wrapping material that at least partially surrounds a bale of material.
Figure 11:
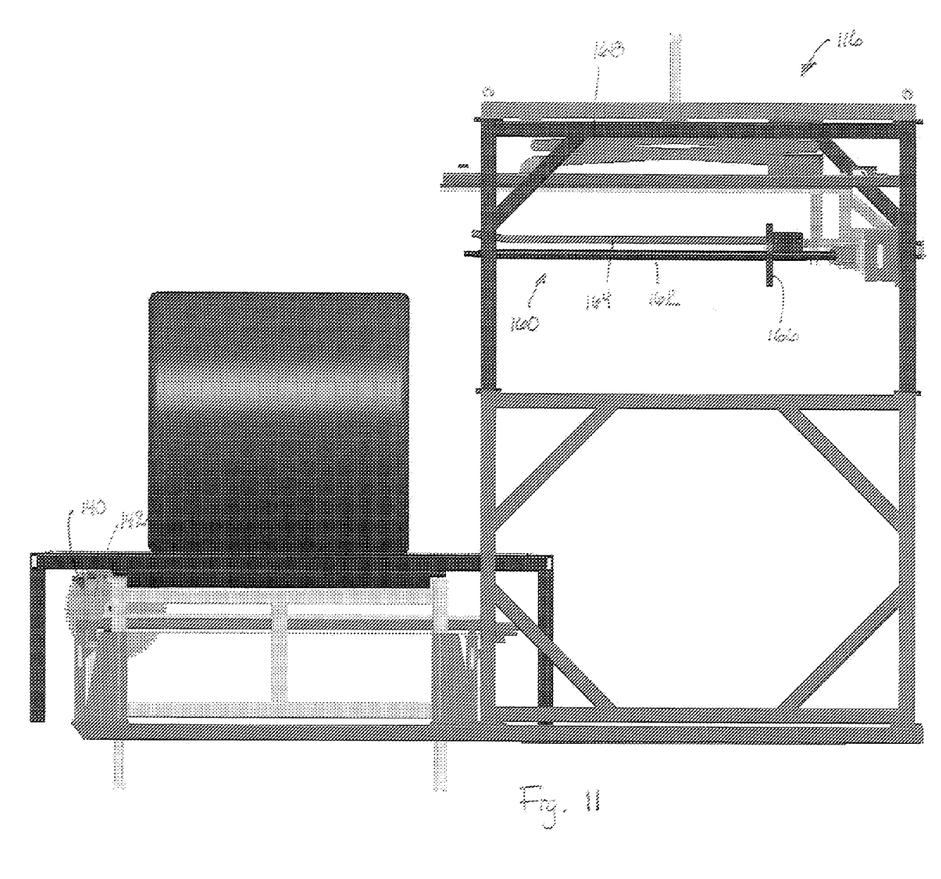
FIG. 11 is a front view of the material removal system of FIG. 10.

FIGS. 10 and 11 illustrate an alternative embodiment of a material unwrapping and removal system 110. System 110 generally includes a cutting and material pulling station 112 and a material wind-up and stripping station 116. The system 110 also includes a flat conveyor system 120 that is used to move each bale into its desired location during the steps of removing material. A number of different conveyor systems can be used, but one exemplary system includes a series of belts and/or chains that are positioned to be generally adjacent to each other across the width of the system 110 and each of its stations. The conveyor 120 may include a series of drive chains or roller chains that are driven by an electric motor or gearbox, for example.

The process of wrapping material removal begins at the station 112 by loading a bale directly onto the station 112 (e.g., by a forklift operator) or by conveying the bale to the station 112 by another adjacent conveyor or other piece of equipment (not shown). The shape of the bale (e.g., rectangular cube or cylindrical), along with the size of the bale, can then be determined using one or more sensors and/or feedback systems. After the dimensions of the bale are determined, the bale can then be passed over a cutting mechanism 140, which can be a rotating saw blade 142 that is positioned on a support frame, for example. The saw blade 142 may be a circular disc with teeth, such as a metal saw blade, or may instead include a disc made of an abrasive or other material that is sufficiently sharp that it can cut through the wrapping material. The speed at which the saw blade 142 rotates may be controlled by a conventional motor and control system that provides a required rotation speed to correspond with the particular material that is being cut. Alternatively, the bale may be held in a stationary position while the cutting mechanism 140 moves across the length of the bale to cut the wrapping material. In either case, the speed at which the saw blade 142 rotates can be selected and adjusted to optimize the cutting performance of the saw blade 142. The blade 142 extends upwardly through an opening in the deck of the conveyor system 120 and is positioned vertically so that it can cut through any wrapping materials of the bale, but is not positioned so high that it causes excessive damage to the bale itself. After the wrapping material has been cut, the bale is ready to be further processed in the system 110.

Next, rollers that are positioned under the conveyor system 120 can be raised upwardly from beneath the conveyor system 120 so that they extend through openings 152,154 in the conveyor until they contact the bottom surface of the bale. This can be accomplished via hydraulic cylinders, for example. These rollers are preferably long enough that they can contact most or all of the length of the bale that is being processed. The rollers can then be activated so that they rotate in opposite directions from each other to essentially "pull" the wrapping material away from the line along which it was cut. That is, the rollers pull the wrapping material(s) (e.g., net wrap and/or twine) from under the bale, while the weight of the bale is at least partially supported by the rollers.

The rollers can have a variety of different configurations, but in one exemplary embodiment, the rollers are 8 inches in diameter and are approximately 7 feet long. In order to provide a desired level of friction between the wrapping material and the rollers the outer surface of the rollers can be made of a rubberized material or other material against which the wrapping material does not slip. After the material pulling operation is complete, the rollers can retract below the surface of the conveyor system 120 so that they do not interfere with further processing of the bale. At this point, the cut ends of the wrapping material should be loose so that the wrapping material drapes or hangs freely over the top of the bale. It is noted that if the wrapping material is twine, the rolling operation to free the ends of the twine from under the roller may or may not be used, as desired, while the rolling operation would typically be used for net wrap or other wrapping materials that have more surface area than twine, such as net wrap materials.

After the wrapping material ends are free from under the bale, the conveyor system 120 can move the bale into the material wind-up and stripping station 116, or the bale can remain stationary while a material wind-up system 160 is moved into engagement with the bale. In either case, the material wind-up system 160 includes at least two spears 162, 164 that extend longitudinally from a base plate 166. The material wind-up system 160 is vertically moveable to position one of the spears 162, 164 so that it will be located at least slightly below the wrapping material (i.e., between inner surface of the wrapping material and the outer surface of the bale itself). At least portions of the material wind-up system 160 can be vertically moveable via a scissor lift 168 or one or more hydraulic cylinders to position it in a desired location relative to the bale.

Once one of the spears 162, 164 is fully engaged along at least a portion of its length with the wrapping material, the spear that is not positioned under the wrapping material can optionally be moved to clamp or grasp the wrapping material between the two spears, although it is also contemplated that the spears 162, 164 do not move relative to each other. Whether or not a clamping motion is activated, the material wind-up system 160 can then be moved upwardly at least slightly relative to the outer surface of the bale until a desired amount of tension is placed on the wrapping material. The spears 162, 164 can then be rotated or spun via their support plate 166 until all or most of the wrapping material is wrapped around the spears 162, 164. Once the wrapping material is wrapped around the spears in this way, the bale can be moved out of the system 110, if desired, by moving it via the conveyor into another manufacturing process, for example.

At this point, the wrapping material will be entirely removed from the bale and wrapped around the spears 162, 164, and the material wind-up system 160 can be rotated from a position to where the spears 162, 164 are extending generally along the longitudinal axis of the bale to a position that is at an angle from this longitudinal axis. For example, spears 162, 164 can be positioned at approximately 90 degrees from the longitudinal axis of the bale so that they extend outwardly from the area immediately adjacent to the station 116. If one or both of the spears 162, 164 had been moved relative to each other to provide a clamping motion, such a clamping motion can be reversed at this point, if desired, to provide for at least a slight relief of the clamping force on the wrapping material.

The station 116 further includes an embodiment of a material removal member 170 that is slideable along the length of the spears 162, 164 after the spears 162, 164 are rotated to meet the material removal member. In this embodiment, the material removal member 170 comprises a U-shaped bracket 172 with an internal radius that is small enough that the surface of the bracket 172 will push or strip the wrapping material from the spears 162, 164 as it activated to move laterally along the length of the spears.

Figure 12:
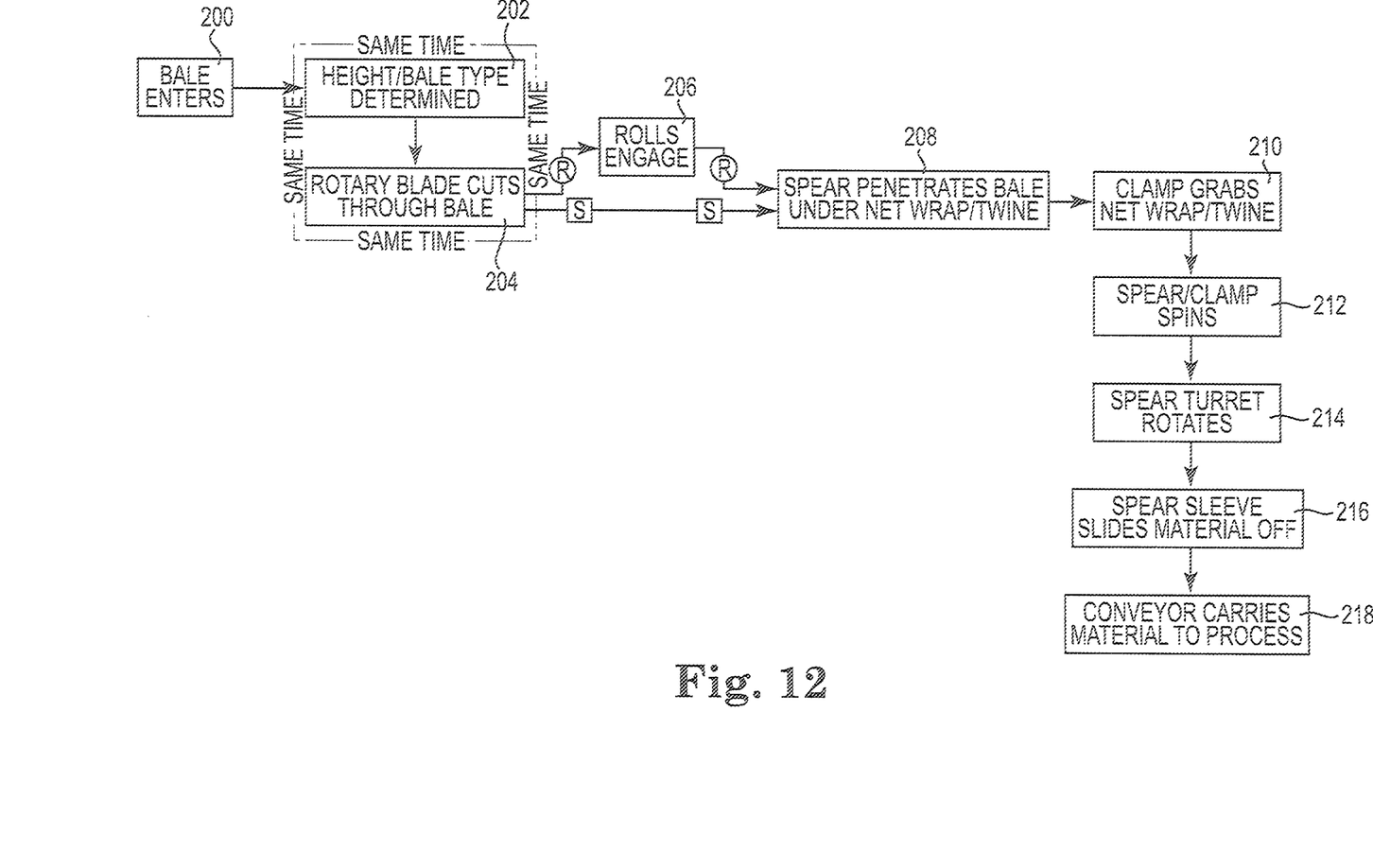
FIG. 12 is a flow chart of processing steps for removing material wrapping a bale, in accordance with an embodiment of the invention.

FIG. 12 is a flow chart describing one exemplary method of removing net wrap and/or twine from bales of material, which begins with a step 200 in which a bale of material enters a material removal system and ends with a step 218 in which a conveyor carries material from which net wrap and/or twine has been removed to another process, such as a cellulosic ethanol process. After the step 200, steps 202 and 204 can optionally be performed at the same time, wherein step 202 includes determining the height and type of bale that has entered the system, and step 204 includes using a rotary blade to cut through wrapping material on the outside of the bale. In step 206, rollers can engage with the bale, which can be done in order to free the loose edges of the wrapping material from the bale. Next, one or more spears can penetrate the bale under the net wrap or twine, as is set out in step 208, and then a clamp can grab the net wrap or twine, as is set out in step 210. The spear/clamp can then spin to wrap the wrapping material around it, as in step 212, and then the step 214 can take place, in which the spear turret rotates. Step 216 can then be performed, in which a spear sleeve can be used to slide the wrapping material from the spears and then the bale material can be moved by a conveyor to another process, as in step 218. All of these steps are not necessarily performed on every bale of material, and it is contemplated that other processing steps can be added and/or illustrated processing steps can be eliminated for some or all of the methods of the invention.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but is further intended to encompass equivalents of those structures.

The invention claimed is:

1. A method of removing a wrapping material from the outer surface of a bale of material, comprising the steps of:
    moving a bale of material into a cutting station, wherein an outer surface of the bale of material is at least partially surrounded by a wrapping material;
    cutting the wrapping material along a length of the bale in a longitudinal direction to form a first end and a second end of the wrapping material;
    moving a plurality of rollers into contact with the wrapping material;
    rotating the plurality of rollers relative to the wrapping material until the first and second ends of the wrapping material are free to move relative to an outer surface of the bale;
    placing a first spear of a material wind-up system between the outer surface of the bale and the wrapping material, wherein the material wind-up system further comprises a second spear spaced from the first spear;
    rotating the material wind-up system to wind the wrapping material around the first and second spears; and
    stripping the wrapping material from the first and second spears.

2. The method of claim 1, further comprising a step of conveying the bale from the cutting station to a material pulling station after the wrapping material is cut.

3. The method of claim 1, wherein the plurality of rollers are positioned below a conveyor prior to moving the rollers into contact with the wrapping material, and then the rollers are moved to contact the wrapping material.

4. The method of claim 1, wherein the step of rotating the plurality of rollers comprises rotating a first roller in a first direction and a second roller in a second direction that is opposite the first direction.

5. The method of claim 1, wherein the step of cutting the wrapping material comprises moving the bale relative to a cutting system.

6. The method of claim 1, wherein the step of cutting the wrapping material comprises moving a cutting system relative to the bale while the bale is stationary.

7. The method of claim 1, wherein the step of cutting the wrapping material comprises rotating a rotary cutter relative to the wrapping material.

8. The method of claim 7, wherein a speed at which the rotary cutter rotates is coordinated with a speed at which the bale is being moved along a conveyor system.

9. The method of claim 8, wherein the conveyor system comprises a conveyor deck with an opening through which the rotary cutter is extendable.

10. The method of claim 1, wherein the plurality of rollers support the bale during the step of rotating the rollers.

11. The method of claim 1, wherein the wrapping material comprises multiple wrappings of a twine material.

12. The method of claim 1, wherein the wrapping material comprises a net wrap material.

13. The method of claim 1, wherein the bale of material comprises a cylindrical bale of material.

14. The method of claim 1, wherein the bale of material comprises a rectangular cube of material.

* * * * *